United States Patent
Corsmeier et al.

(10) Patent No.: US 10,443,415 B2
(45) Date of Patent: Oct. 15, 2019

(54) FLOWPATH ASSEMBLY FOR A GAS TURBINE ENGINE

(71) Applicant: General Electric Company, Schenectady, NY (US)

(72) Inventors: Donald Michael Corsmeier, West Chester, OH (US); Bryan Harris Farrar, Cincinnati, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 812 days.

(21) Appl. No.: 15/085,552

(22) Filed: Mar. 30, 2016

(65) Prior Publication Data
US 2017/0284211 A1 Oct. 5, 2017

(51) Int. Cl.
- F01D 9/04 (2006.01)
- F01D 25/00 (2006.01)
- F01D 25/14 (2006.01)
- F02C 7/04 (2006.01)

(52) U.S. Cl.
CPC .......... F01D 9/04 (2013.01); F01D 9/047 (2013.01); F01D 25/005 (2013.01); F01D 25/145 (2013.01); F02C 7/04 (2013.01); F05D 2220/323 (2013.01); F05D 2240/128 (2013.01); F05D 2300/6033 (2013.01); Y02T 50/672 (2013.01)

(58) Field of Classification Search
CPC .......... F01D 9/04; F01D 9/047; F01D 25/145; F02C 7/04
See application file for complete search history.

(56) References Cited

U.S. PATENT DOCUMENTS

| | | | | |
|---|---|---|---|---|
| 5,357,744 A | * | 10/1994 | Czachor | F01D 9/065 415/134 |
| 5,525,035 A | | 6/1996 | Ben-Porat et al. | |
| 7,013,635 B2 | | 3/2006 | Cohen et al. | |
| 7,094,021 B2 | * | 8/2006 | Haubert | F01D 5/147 415/115 |
| 7,137,255 B2 | | 11/2006 | Schmotolocha et al. | |
| 7,200,933 B2 | * | 4/2007 | Lundgren | B23P 15/04 29/889.2 |
| 7,322,796 B2 | * | 1/2008 | Pietraszkiewicz | F01D 5/147 29/889.22 |

(Continued)

FOREIGN PATENT DOCUMENTS

| CN | 1924297 A | 3/2007 |
|---|---|---|
| CN | 103306746 A | 9/2013 |

(Continued)

OTHER PUBLICATIONS

Office Action issued in connection with corresponding CA Application No. 2955538 dated Dec. 1, 2017.

(Continued)

*Primary Examiner* — Woody A Lee, Jr.
(74) *Attorney, Agent, or Firm* — General Electric Company; Pamela Kachur

(57) ABSTRACT

A flowpath apparatus for a gas turbine engine includes: a plurality of ducts arranged in an array, each duct including a peripheral wall structure having a closed perimeter that defines a flow channel from an upstream end to a downstream end thereof; and a support structure positioning a the plurality of ducts in an array configuration.

16 Claims, 9 Drawing Sheets

(56) References Cited

U.S. PATENT DOCUMENTS

| | | | |
|---|---|---|---|
| 7,721,547 B2 | 5/2010 | Bancalari et al. | |
| 9,061,349 B2 | 6/2015 | Lee et al. | |
| 9,845,692 B2* | 12/2017 | Jamison | F01D 5/284 |
| 9,915,154 B2* | 3/2018 | Berczik | C04B 37/00 |
| 2004/0253096 A1* | 12/2004 | Legg | F01D 9/04 |
| | | | 415/191 |
| 2005/0076504 A1 | 4/2005 | Morrison et al. | |
| 2006/0288707 A1 | 12/2006 | Weaver et al. | |
| 2008/0279679 A1* | 11/2008 | Morrison | F01D 9/042 |
| | | | 415/191 |
| 2010/0275614 A1 | 11/2010 | Fontaine et al. | |
| 2011/0081237 A1 | 4/2011 | Durocher et al. | |
| 2013/0000769 A1 | 1/2013 | Smith | |
| 2013/0094951 A1* | 4/2013 | McCaffrey | F01D 25/162 |
| | | | 415/200 |
| 2013/0239585 A1 | 9/2013 | Morrison | |
| 2014/0064956 A1 | 3/2014 | Drane | |
| 2014/0161623 A1* | 6/2014 | Zurmehly | F01D 5/12 |
| | | | 416/241 R |
| 2014/0373556 A1 | 12/2014 | Aronsson et al. | |
| 2015/0307190 A1* | 10/2015 | Probst | B29C 70/30 |
| | | | 415/208.2 |

FOREIGN PATENT DOCUMENTS

| | | |
|---|---|---|
| CN | 104246196 A | 12/2014 |
| GB | 585 335 A | 2/1947 |
| GB | 585335 A | 2/1947 |
| JP | 2005-535825 A | 11/2005 |
| JP | 2006-342798 A | 12/2006 |
| JP | 2007-064215 A | 3/2007 |
| JP | 2010-127277 A | 6/2010 |
| JP | 2010-230003 A | 10/2010 |
| JP | 2015-502495 A | 1/2015 |
| JP | 2015-503701 A | 2/2015 |
| JP | 2015-504998 A | 2/2015 |
| JP | 2015-510101 A | 4/2015 |
| JP | 2015-519504 A | 7/2015 |
| WO | 2015/021086 A1 | 2/2015 |

OTHER PUBLICATIONS

Extended European Search Report and Opinion issued in connection with corresponding EP Application No. 17153383.9 dated Jul. 27, 2017.

Machine Translation and Notification of reasons for refusal issued in connection with corresponding JP Application No. 2017-007237 dated Mar. 13, 2018.

Machine Translation and First Office Action and Search issued in connection with corresponding CN Application No. 201710055906.7 dated Sep. 30, 2018.

Machine Translation and Notification of Reasons for Refusal issued in connection with corresponding JP Application No. 2017-007237 dated Dec. 4, 2018.

\* cited by examiner

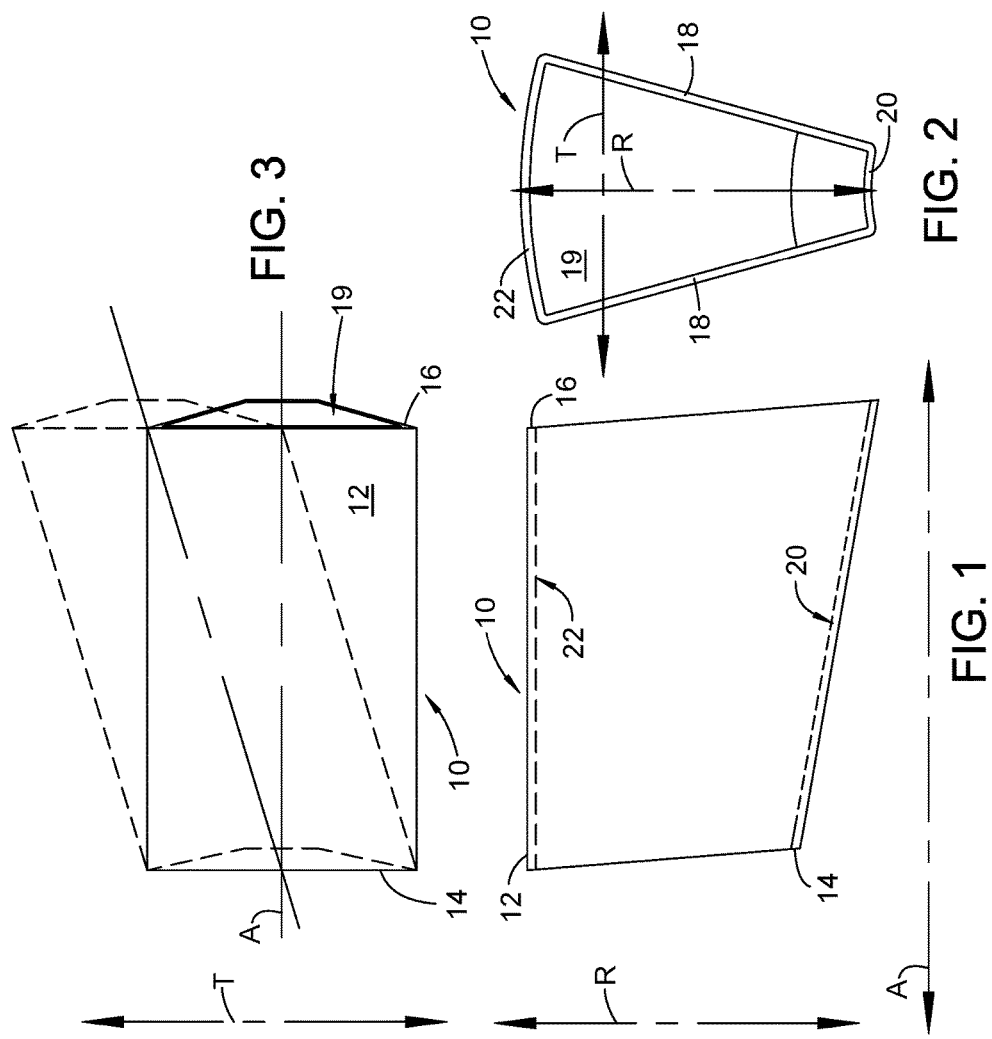

FLOWPATH ASSEMBLY FOR A GAS TURBINE ENGINE

The U.S. Government may have certain rights in this invention pursuant to contract no. FA8650-09-D-2922 awarded by the Department of the Air Force.

BACKGROUND OF THE INVENTION

This invention relates generally to gas turbine engines and in particular to flowpath structures within a gas turbine engine.

A typical gas turbine engine includes a turbomachinery core having a high pressure compressor, a combustor, and a high pressure turbine in serial flow relationship. The core is operable in a known manner to generate a primary gas flow. In practical applications the core is typically combined with other elements such as power turbines, fans, augmentors, etc. to create a useful engine for a specific application, such as turning a propeller, powering an aircraft in flight, or driving a mechanical load.

Gas turbine engines include a flowpath defined in part by ducts, liners, tubes, and similar structures that directs a working fluid through the various components of the engine. Some portions of the flowpath are subject to hot, high-velocity gases. Prior art flowpath components, particularly those in the hot section of the engine, often use metal alloy structures protected with a thermal barrier coating ("TBC").

Metallic structures can be replaced with materials having lower density, such as ceramic matrix composites (CMCs). Such materials offer significant weight savings compared to metal alloys.

One problem with CMC materials is that they cannot be fabricated or mechanically fastened in the same way as components made from metal alloys, and therefore cannot be substituted directly for metallic components.

Another problem with CMC materials is that they have relatively low tensile ductility or low strain to failure when compared to metallic materials. Also CMCs have a coefficient of thermal expansion (CTE) significantly different from metal alloys.

BRIEF SUMMARY OF THE INVENTION

At least one of the above-noted problems is addressed by a flowpath assembly including two or more ducts each having a perimeter wall structure that defines a flow channel, the ducts being assembled into an array using a support structure.

According to one aspect of the technology described herein, a flowpath apparatus for a gas turbine engine includes: a plurality of ducts arranged in an array, each duct including a peripheral wall structure having a closed perimeter that defines a flow channel extending from an upstream end to a downstream end thereof; and a support structure positioning the plurality of ducts in an array configuration.

According to another aspect of the technology described herein, a flowpath apparatus for a gas turbine engine includes: an annular central member; a plurality of ducts arranged in a ring around the annular central member, each duct comprising a peripheral wall structure having a closed perimeter that defines a flow channel extending from an upstream end to a downstream end thereof; at least one ring surrounding the plurality of ducts; and a radial array of radial members extending between the central member and the at least one ring.

BRIEF DESCRIPTION OF THE DRAWINGS

The invention may be best understood by reference to the following description taken in conjunction with the accompanying drawing figures in which:

FIG. 1 is a side elevation view of an exemplary duct;
FIG. 2 is an aft elevation view of the duct of FIG. 1;
FIG. 3 is a top plan view of the duct of FIG. 1.

DETAILED DESCRIPTION OF THE INVENTION

Figure 4:
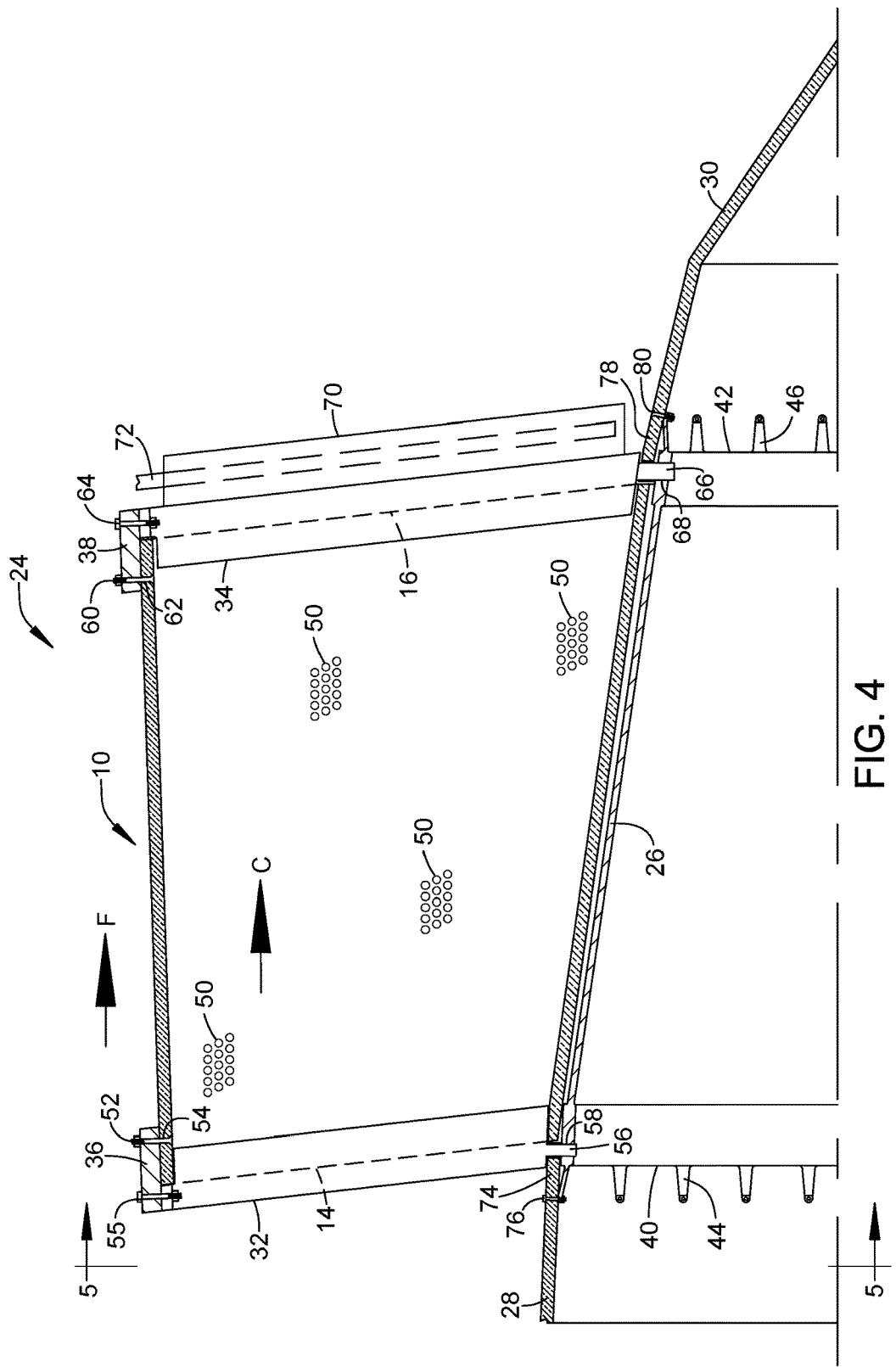
FIG. 4 is a side half-sectional view of an exemplary flowpath assembly using the duct shown in FIGS. 1 and 2.

Referring to the drawings wherein identical reference numerals denote the same elements throughout the various views, FIG. 1 depicts an exemplary duct 10 which may be used to construct various types of flowpath assemblies as described in more detail below. The duct 10 includes a perimeter wall structure 12 that extends from an upstream end 14 to a downstream end 16. The perimeter wall structure 12 extends around a closed perimeter thereby surrounding and defining a flow channel 19 that extends from the upstream end 14 to the downstream end 16.

A longitudinal axis "A" is shown in FIG. 1 representing an axial or longitudinal direction. A radial axis "R" is perpendicular to the longitudinal axis A and represents a radial direction. As seen in FIG. 2, a tangential axis "T" is perpendicular to both the longitudinal axis A in the radial axis R, and represents a circumferential or tangential direction. As used herein, directional terms such as axial, radial, and tangential used for purposes of convenient reference in description and do not require that the described structures have any particular absolute orientation.

The perimeter wall structure 12 may take any convenient form as required for a particular application. In the specific example illustrated, the perimeter wall structure 12 includes a pair of spaced-apart lateral walls 18. Inboard ends of the lateral walls 18 are connected by an inboard wall 20, which is a body of revolution generated about longitudinal axis A. Outboard ends of the lateral walls 18 are connected by an outboard wall 22, which is also a body of revolution, generated about longitudinal axis A. In this configuration, the flow channel 19 has a roughly trapezoidal flow area.

The perimeter wall structure 12 may be built up from a group of components. The components could be bonded, mechanically fastened or otherwise joined. Alternatively, the perimeter wall structure 12 may be an integral, unitary or monolithic structure.

As noted above, other forms are possible to suit particular applications. For example, the separate inboard wall 20 could be eliminated and the pair of lateral walls 18 could merge together at their mutual inboard ends, forming a roughly triangular flow area. Other possibilities include polygonal and curvilinear shapes.

The flow channel 19 may have a constant flow area from the upstream end 14 to the downstream end 16. Alternatively, the ratio of flow area at the downstream end 16 to the upstream end 14 may be other than unity. In other words, the area may increase or decrease in the direction of flow through the flow channel 19, with the result that the duct 10 then functions as a nozzle or diffuser.

The flow channel 19 may be axially aligned, or it may be oriented to affect the tangential velocity of a fluid flowing through it. For example it may be used to increase or decrease the tangential velocity or "swirl" of the fluid. A non-axial orientation is illustrated by dashed lines in FIG. 3.

The duct 10 may be constructed in whole or in part from a low density, high-temperature capable material. Examples of such materials include composite materials such as ceramic matrix composites ("CMC"). Generally, commercially available CMC materials include a ceramic type fiber carried in a ceramic type matrix. Examples of known types of CMC materials are referred using broad classifications of SiC/SiC, C/SiC, C/C, and Ox/Ox (oxide-oxide).

In general, such materials have a low density, high-temperature capabilities, and high strength-to-weight ratios, but also have lower ductility than metal alloys and are generally more difficult to fabricate and to mechanically fasten than metal alloys. These materials will be referred to generally herein as "ceramic-based composites".

As a general principle, two or more of the ducts 10 described above may be assembled to define a flowpath structure by using a support structure, for example one or more struts, braces, brackets, or rings, to support and position the ducts 10 in an array of two or more ducts. Nonlimiting examples of arrays include lines, rectangles, polygons, arcs, or ring configurations. Nonlimiting examples of structures utilizing such arc or ring configurations include inlet and exhaust systems, flowpaths, and turbine frames. In creating the flowpath structure, the ducts 10 may have different wedge shapes, orientation angles, etc. to accommodate the support structure (for example, struts of varying sizes). Furthermore, some or all of the ducts 10 could be of different contours assembled into a serpentine or other shaped non-round exhaust system or other flowpath.

Figure 5:
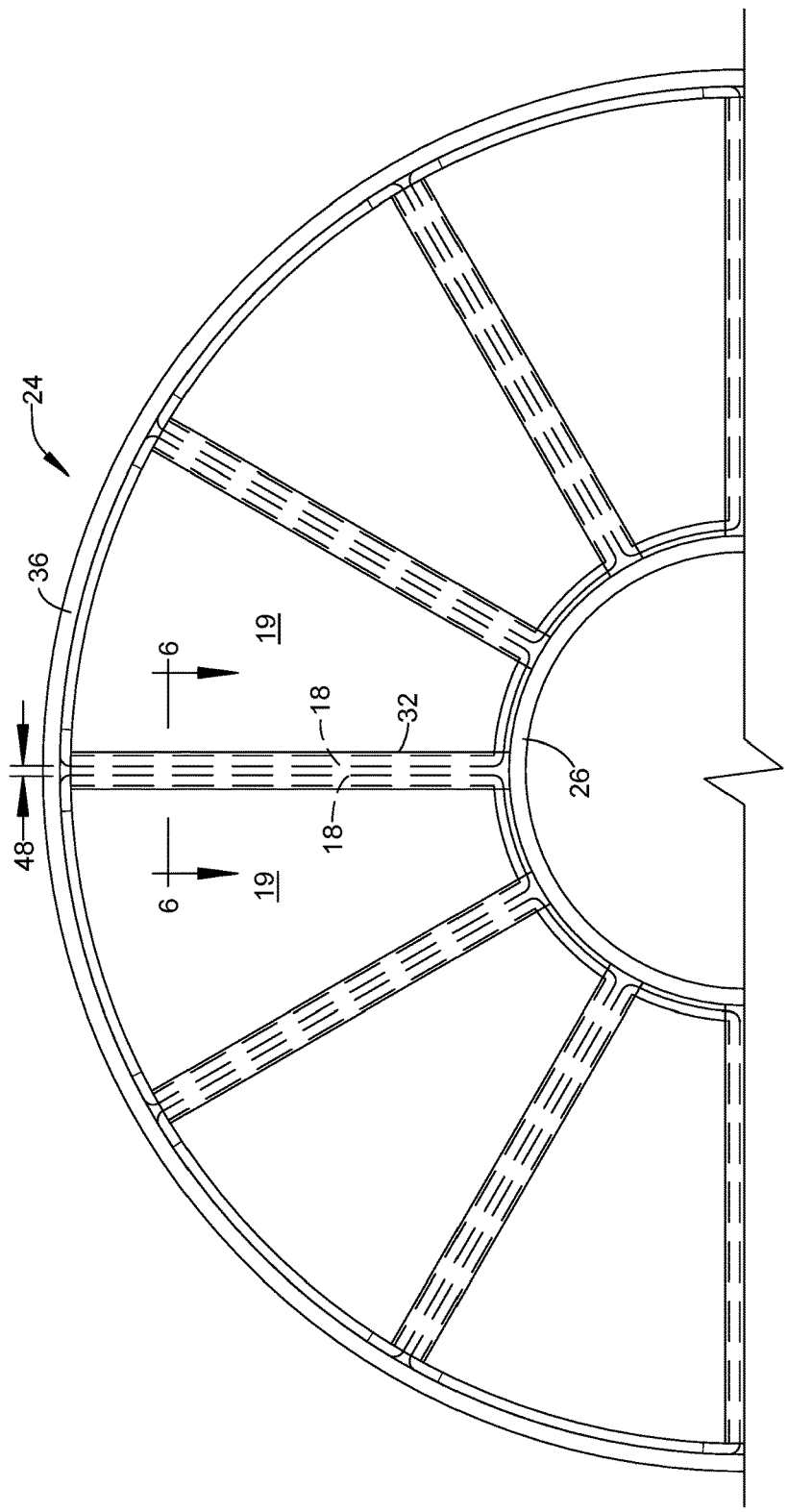
FIG. 5 is a view taken along lines 5-5 of FIG. 4.
Figure 6:
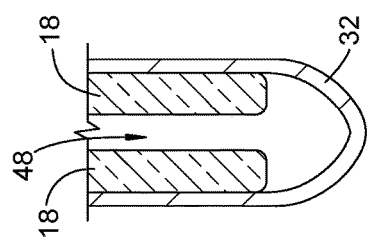
FIG. 6 is a view taken along lines 6-6 of FIG. 5.

FIGS. 4-6 illustrate an exemplary flowpath assembly 24. This specific example would be located just aft of a final turbine stage or a turbine rear frame (not shown) in a mixed-flow turbofan engine and upstream of an augmentor or afterburner (not shown) in such an engine. The basic components of the flowpath assembly 24 include a hub 26, an inner diffuser liner 28, a centerbody 30, an array of ducts 10, an array of forward closeouts 32, an array of aft closeouts 34, a forward ring 36, and an aft ring 38. Each of these components will be described in more detail below.

The hub 26 is a central structural member and is generally annular with a forward end 40 and an aft end 42. It may be constructed, for example, from a metal alloy. An array of forward tabs 44 extend axially forward from the forward end 40. An array of aft tabs 46 extends axially aft from the aft end 42. Each of the forward tabs 44 and aft tabs 46 is a relatively thin elongated member which is able to resiliently flex such that its distal end can move inward or outward in the radial direction.

A plurality of ducts 10 as described above and shown in FIGS. 1-3 are arrayed in an annulus or ring around the hub 26. The ducts 10 are positioned such that one of the lateral walls 18 of a first duct 10 lies closely adjacent to one of the lateral walls 18 of the adjacent duct 10, thus defining a gap 48 between the two adjacent ducts 10. In the illustrated example, the ducts 10 serve as mixers. In order to accomplish this function, the perimeter wall structure 12 is perforated with a plurality of holes 50. In operation, a core flow stream "C" passes through the flow channel 19, while the space exterior to the ducts 10 is exposed to a fan flow stream "F" which has a higher static pressure than the core flow stream C. In operation, the fan flow stream F passes through the holes 50 and mixes with the core flow stream C.

The forward ring 36 surrounds the upstream ends 14 of the ducts 10 and maintains their lateral spacing. Any suitable means of attachment may be used. In the illustrated example, mechanical fasteners 52 extend through the forward ring 36 and through corresponding holes 54 in the duct 10. Various means may be used to prevent concentrated loads from being applied to the ducts 10 by the mechanical fasteners 52.

The forward closeouts 32 are arrayed in an annulus or ring around the hub 26. Each forward closeout 32 is positioned in tangential alignment with the gap 48 between two adjacent ducts 10. As seen in FIG. 6, the forward closeout 32 has a generally C-shaped section which accepts the lateral walls 18 of adjacent ducts 10 and seals the gap 48. The outboard ends of the forward closeouts 32 are coupled to the forward ring 36, for example using the illustrated fasteners 55. The inboard ends of the forward closeouts 32 are coupled to the hub 26. In the illustrated example, the forward closeouts 32 include pins 56 that extend radially inward through holes 58 in the hub 26.

The aft ring 38 surrounds the downstream ends 16 of the ducts 10 and maintains their lateral spacing. Any suitable means of attachment may be used. In the illustrated example, mechanical fasteners 60 extend through the aft ring 38 and through corresponding holes 62 in the duct 10. Various means may be used to prevent concentrated loads from being applied to the ducts 10 by the mechanical fasteners 60.

The aft closeouts 34 are arrayed in an annulus or ring around the hub 26. Each aft closeout 34 is positioned in tangential alignment with the gap 48 between two adjacent ducts 10. The aft closeout 34 has a generally C-shaped section similar to that of the forward closeout 32, which accepts lateral walls 18 of adjacent ducts 10 and seals the gap 48. The outboard ends of the aft closeouts 34 are coupled to the aft ring 38, for example using the illustrated fasteners 64. The inboard ends of the aft closeouts 34 are coupled to the hub 26. In the illustrated example, the aft closeouts 34 include pins 66 that extend radially inward through holes 68 in the hub 26.

In the illustrated example, the aft closeouts 34 also function as a portion of an augmentor or afterburner. One or more of the aft closeouts 34 incorporate a radial flameholder 70 and one or more of the aft closeouts 34 incorporate a radial spraybar 72 which is operable to receive fuel and discharge it through a series of holes or nozzles. The fuel would then be ignited and burned to produce additional thrust in a downstream combustion section of an augmentor or afterburner (not shown).

The inner diffuser liner 28 is a generally annular structure and may be made from a ceramic-based composite. An aft end 74 of the inner diffuser liner 28 sits over the ring of forward tabs 44 and may be attached thereto by the illustrated fasteners 76. This arrangement permits some radial compliance between the hub 26 and the inner diffuser liner 28.

The centerbody 30 is a generally conical structure and may be made from a ceramic-based composite. A forward end 78 of the centerbody 30 sits over the ring of aft tabs 46 and may be attached thereto by the illustrated fasteners 80. This arrangement permits some radial compliance between the hub 26 and the centerbody 30.

In operation, the hub 26, the forward closeouts 32, aft closeouts 34, the forward ring 36, and the aft ring 38 define a support structure which position the ducts 10 so that they define a flowpath. The ducts 10 are thus able to perform the function of containing and guiding a flow of hot high velocity gases. It is believed that the complete flowpath assembly 24 would weigh less than an equivalent structure constructed solely of metal alloys.

Figure 7:
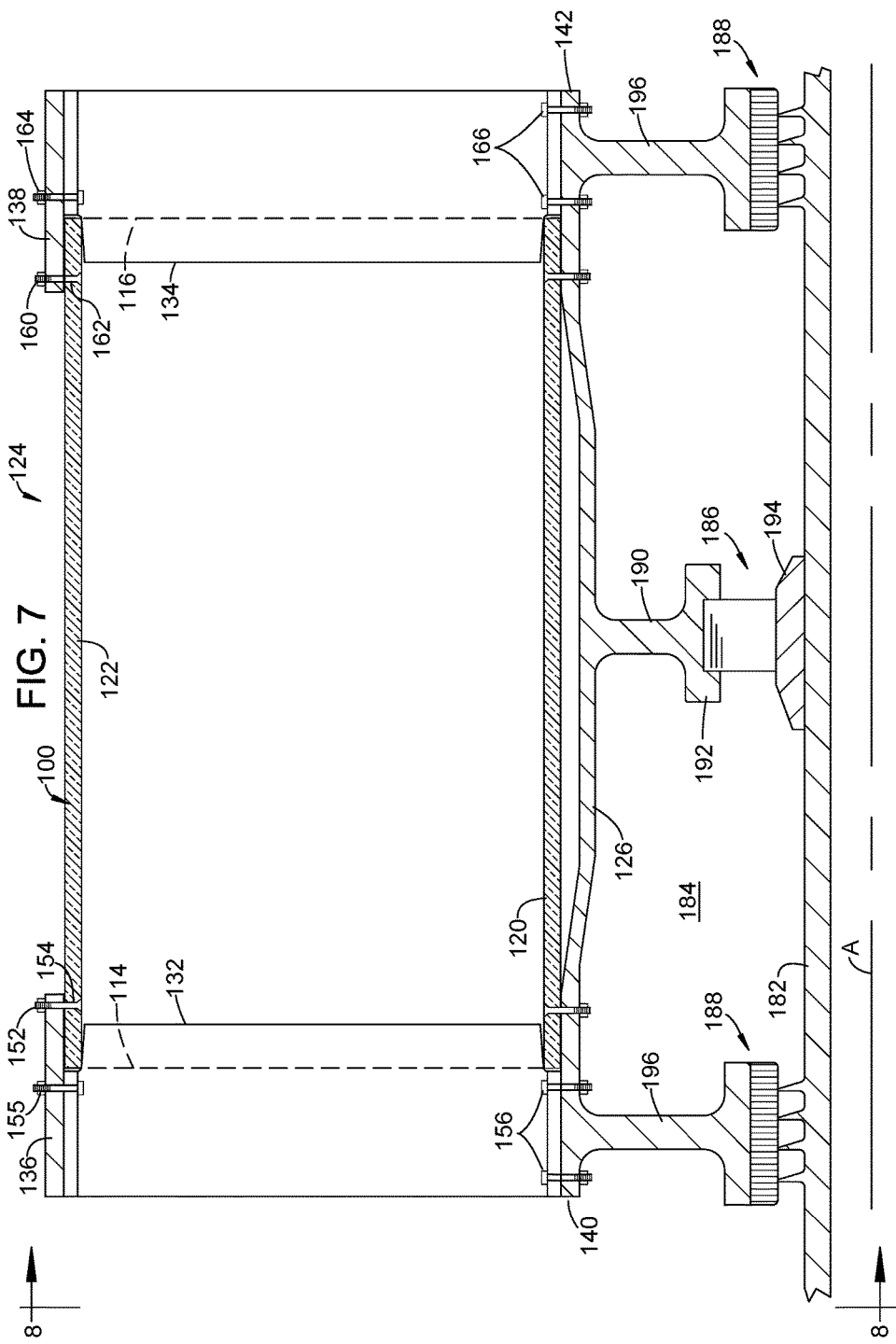
FIG. 7 is a half-sectional view of an exemplary flowpath assembly.
Figure 8:
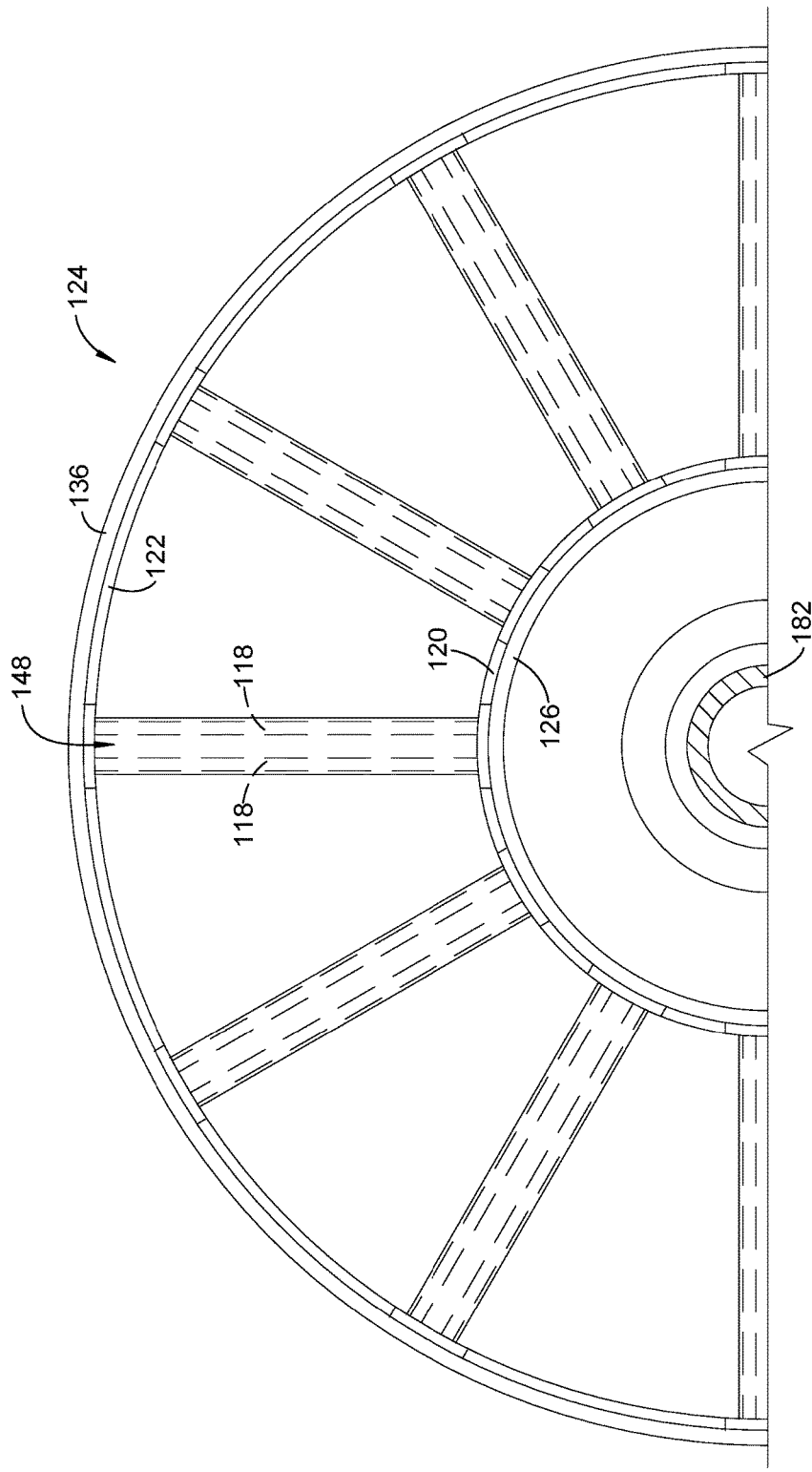
FIG. 8 is a view taken along lines 8-8 of FIG. 7.

FIGS. 7 and 8 illustrate an example of a another type of flowpath assembly 124 that may be constructed using ducts as described above. The basic components of the flowpath assembly 124 include a sump housing 126, an array of ducts 100, an array of forward closeouts 132, an array of aft closeouts 134, a forward ring 136, and an aft ring 138. Each of these components will be described in more detail below.

The sump housing 126 is a central structural member and is generally annular with a forward end 140 and an aft end 142. It may be constructed, for example, from a metal alloy. The sump housing 126 surrounds a shaft 182. The annular volume located between the sump housing 126 and the shaft 182 is referred to as a "sump" 184. Within the sump 184, the shaft 182 is mounted in a rolling-element bearing 186. The bearing 186 is bounded by seal assemblies 188. An annular bearing support arm 190 extends radially inward from the body and receives an outer race 192 of the bearing 186. An inner race 194 of the bearing 186 is mounted to the shaft 182.

A pair of annular seal support arms 196 extend inward from the bearing sump housing 126. Each seal support arm 196 carries a stationary portion of a seal assembly 188. A rotating portion of each seal assembly 188 is mounted to the shaft 182. In the illustrated example, the seal assemblies 188 are noncontact seals such as labyrinth seals.

A plurality of ducts 100 are arrayed in an annulus or ring around the sump housing 126. The ducts 100 are generally similar in construction to the ducts 10 described above and include upstream and downstream ends 114, 116, respectively, a pair of spaced-apart lateral walls 118, an inboard wall 120, and an outboard wall 122. Elements of the ducts 100 not specifically described may be assumed to be identical to the ducts 10 described above. The ducts 100 are positioned such that one of the lateral walls 118 of a first duct 100 lies closely adjacent to one of the lateral walls 118 of the adjacent duct 100, thus defining a gap 148 between the two adjacent ducts 100.

The forward ring 136 surrounds the upstream ends 114 of the ducts 100 and maintains their lateral spacing. In the illustrated example, mechanical fasteners 152 extend through the forward ring 136 and through corresponding holes 154 in the duct 100.

The forward closeouts 132 are arrayed in an annulus or ring around the sump housing 126. Each forward closeout 132 is positioned in tangential alignment with the gap 148 between two adjacent ducts 10. The forward closeout 132 may include a generally C-shaped section which accepts the lateral walls 118 of adjacent ducts 100 and seals the gap 148. The outboard ends of the forward closeouts 132 are coupled to the forward ring 136, for example using the illustrated fasteners 155. The inboard ends of the forward closeouts 132 are coupled to the sump housing 126, for example using the illustrated mechanical fasteners 156.

The aft ring 138 surrounds the downstream ends 116 of the ducts 100 and maintains their lateral spacing. In the illustrated example, mechanical fasteners 160 extend through the aft ring 138 and through corresponding holes 162 in the duct 100.

The aft closeouts 134 are arrayed in an annulus or ring around the sump housing 126. Each aft closeout 134 is positioned in tangential alignment with the gap 148 between two adjacent ducts 100. The aft closeout 134 may include a generally C-shaped section similar to that of the forward closeout 132, which accepts lateral walls 118 of adjacent ducts 100 and seals the gap 148. The outboard ends of the aft closeouts 134 are coupled to the aft ring 138, for example using the illustrated fasteners 164. The inboard ends of the aft closeouts 134 are coupled to the sump housing 126, for example using the illustrated mechanical fasteners 166. The forward and aft closeouts 132 and 134 serve as a structural connection between the sump housing 126 and the ring 136 and 138, so that the ducts 100 do not carry external structural loads.

Figure 9:
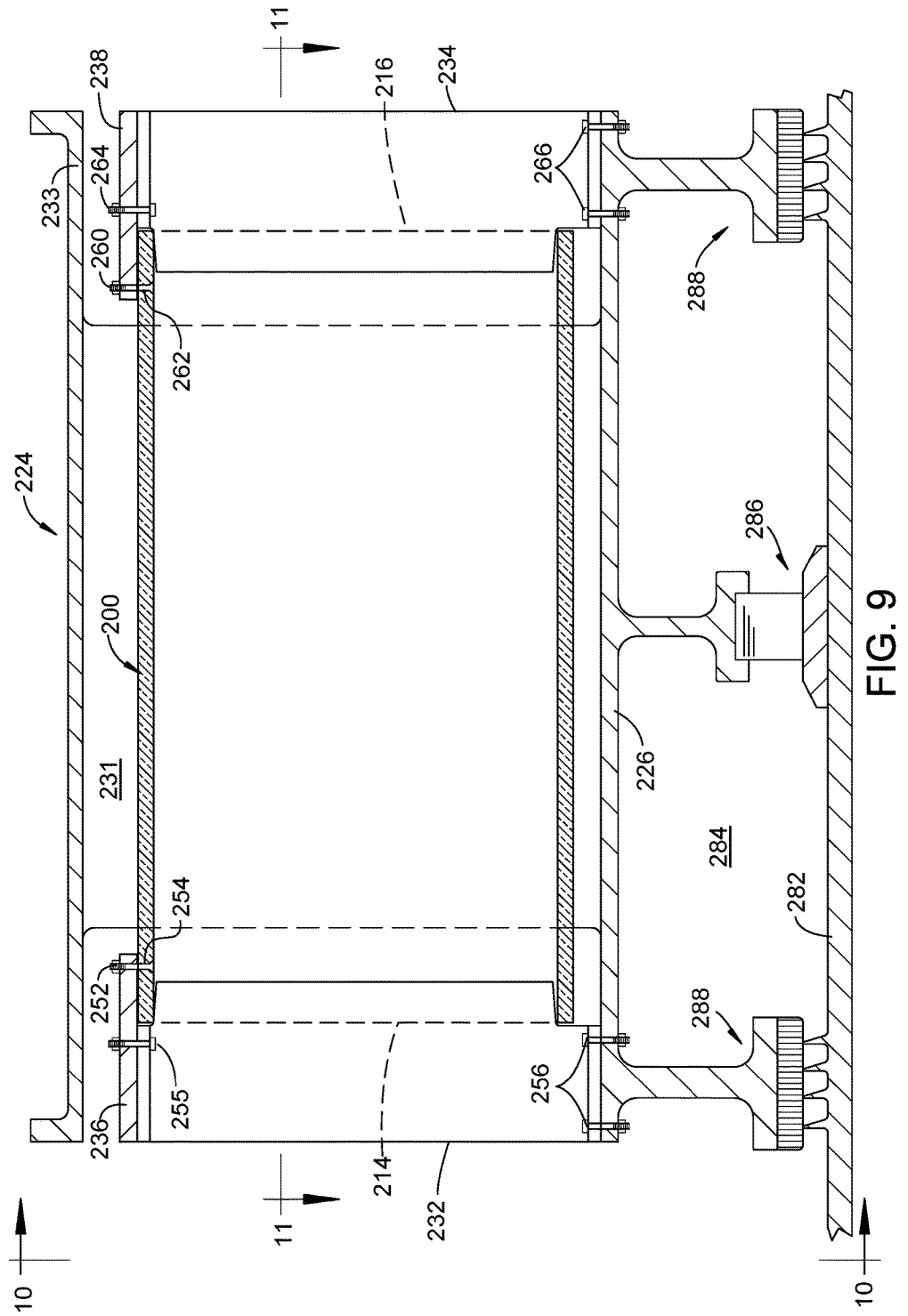
FIG. 9 is a half-sectional view of an exemplary flowpath assembly.
Figure 10:
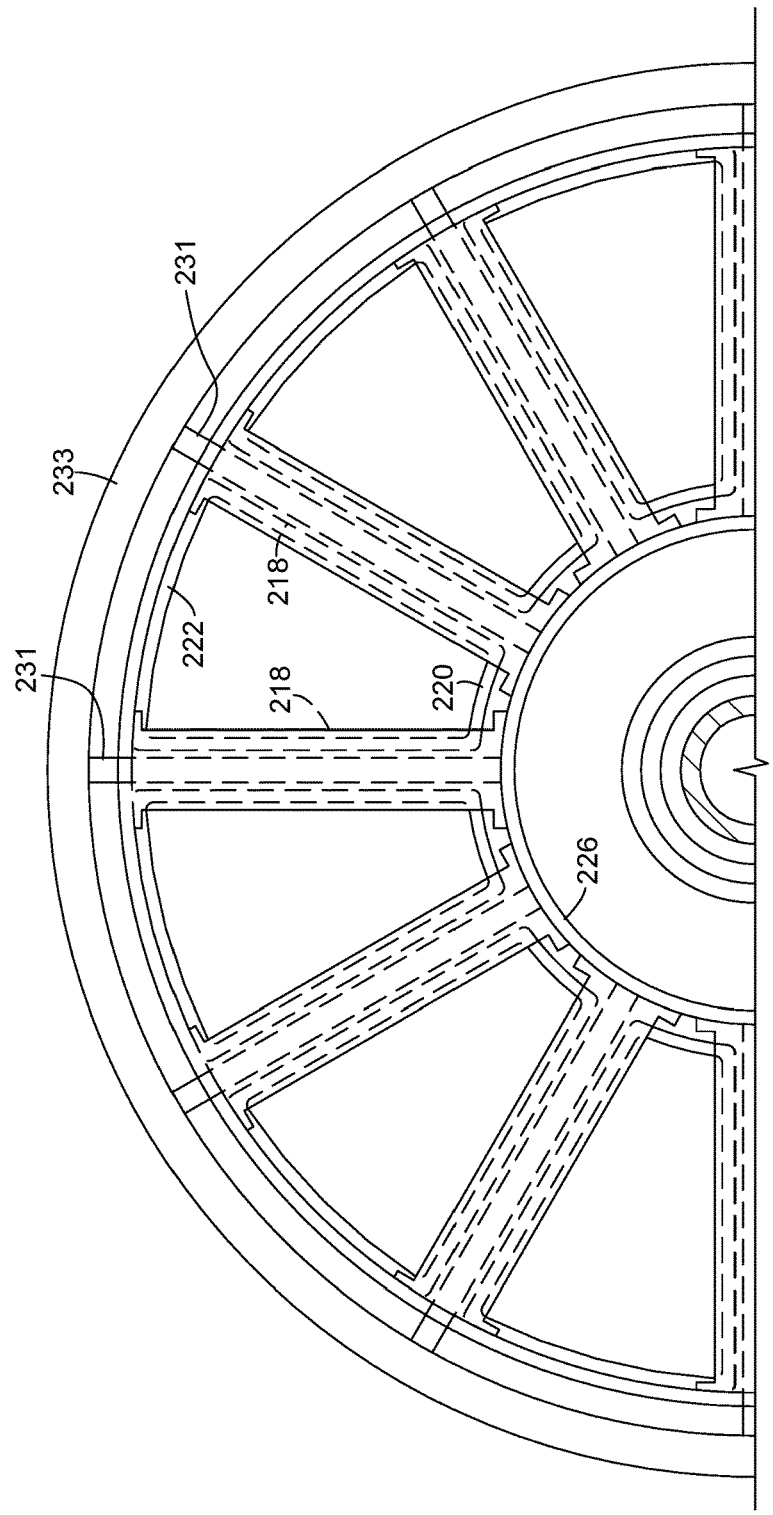
FIG. 10 is a view taken along lines 10-10 of FIG. 9.
Figure 11:
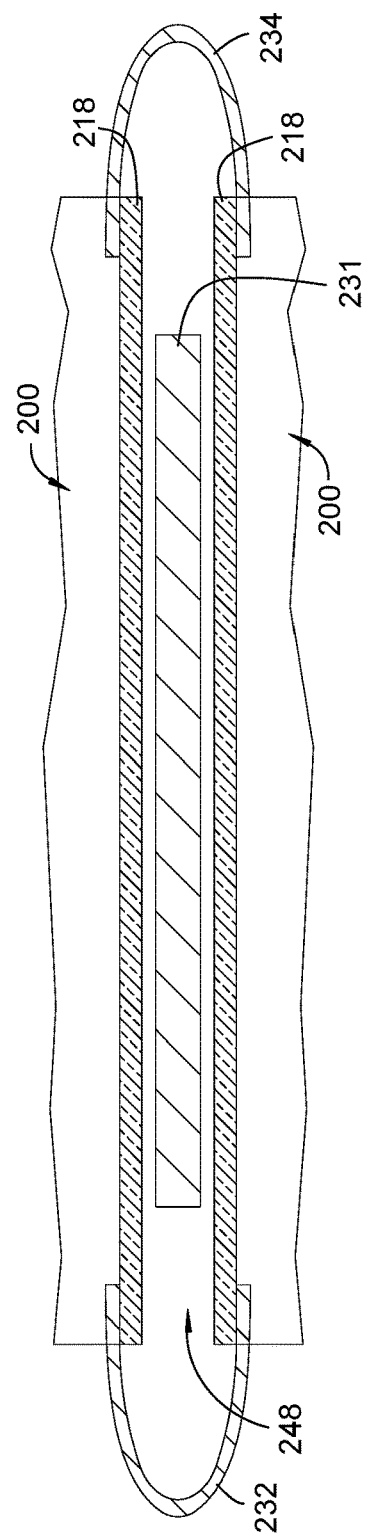
FIG. 11 is a view taken along lines 11-11 of FIG. 9.

FIGS. 9-11 illustrate an example of another type of flowpath assembly 224 that may be constructed using ducts as described above. The basic components of the flowpath assembly 224 include a sump housing 226, an array of ducts 200, an array of struts 231, an array of forward closeouts 232, an array of aft closeouts 234, a forward ring 236, and an aft ring 238. Each of these components will be described in more detail below.

The sump housing 226 is a generally annular central structural member. It may be constructed, for example, from a metal alloy. The sump housing 226 surrounds a shaft 282 and defines a sump 284. Within the sump 284, the shaft 282 is mounted in a rolling-element bearing 286. The bearing 286 is bounded by a pair of seal assemblies 288. The construction of the sump housing 226, the bearing 286, and the seal assemblies 288 is similar to those described above.

A plurality of ducts 200 are arrayed in an annulus or ring around the sump housing 226. The ducts 200 are generally similar in construction to the ducts 10 described above and include upstream and downstream ends 214, 216, respectively, a pair of spaced-apart lateral walls 218, an inboard wall 220, and an outboard wall 222. Elements of the ducts 200 not specifically described may be assumed to be identical to the ducts 10 described above. The ducts 200 are positioned such that one of the lateral walls 218 of a first duct 200 lies closely adjacent to one of the lateral walls 218 of the adjacent duct 200, thus defining a gap 248 between the two adjacent ducts 200.

The struts 231 are arrayed in an annulus or ring around the sump 226 and extend between the sump housing 226 and an outer ring 233. The outer ring 233 may be continuous or segmented. The struts 231 are coupled to the sump 226, and are also coupled to the outer ring 233. In the illustrated example the struts 231 are shown as being integrally formed with the sump housing 226 and the outer ring 233. The mechanical configuration of the struts 231 is not critical to the present invention and other arrangements are possible. For example the struts 231 may be separate components which are connected to the sump housing 226 and/or the outer ring 233 using mechanical fasteners. The struts 231 serve as a structural connection between the sump 226 and the outer ring 233, so that the ducts 200 do not carry external structural loads.

The forward ring 236 surrounds the upstream ends 214 of the ducts 200 and maintains their lateral spacing. In the illustrated example, mechanical fasteners 252 extend through the forward ring 236 and through corresponding holes 254 in the duct 200.

The forward closeouts 232 are arrayed in an annulus or ring around the sump housing 226. Each forward closeout 232 is positioned in tangential alignment with the gap 248 between two adjacent ducts 10. The forward closeout 232 may include a generally C-shaped section which accepts the lateral walls 218 of adjacent ducts 200 and seals the gap 248. The outboard ends of the forward closeouts 232 are coupled to the forward ring 236, for example using the illustrated fasteners 255. The inboard ends of the forward closeouts 232 are coupled to the sump housing 226, for example using the illustrated mechanical fasteners 256.

The aft ring 238 surrounds the downstream ends 216 of the ducts 200 and maintains their lateral spacing. In the illustrated example, mechanical fasteners 260 extend through the aft ring 238 and through corresponding holes 262 in the duct 200.

The aft closeouts 234 are arrayed in an annulus or ring around the sump housing 226. Each aft closeout 234 is positioned in tangential alignment with the gap 248 between two adjacent ducts 200. The aft closeout 234 may include a generally C-shaped section similar to that of the forward closeout 232, which accepts lateral walls 218 of adjacent ducts 200 and seals the gap 248. The outboard ends of the aft closeouts 234 are coupled to the aft ring 238, for example using the illustrated fasteners 264. The inboard ends of the aft closeouts 234 are coupled to the sump housing 226, for example using the illustrated mechanical fasteners 266.

The flowpath assembly 224 is similar in configuration to a conventional turbine frame. In this arrangement the ducts 200 are effectively used as liners for the frame assembly.

The flowpath assemblies described herein have numerous advantages over prior art flowpath structures. A frame assembly constructed using arrayed composite docs is overall less complex and less costly than a composite diffusing frame that might be constructed using discreet composite vanes in an attempt to directly mimic metallic component construction. This approach could be used as a means to line any frame such as a turbine center frame or a turbine rear frame. This approach can be adapted for inlets as well as exhaust systems.

The foregoing has described a flowpath structure for a gas turbine engine. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A flowpath apparatus for a gas turbine engine, comprising:
   a plurality of ducts arranged in an array, each duct comprising a peripheral wall structure having a closed perimeter that defines a flow channel extending from an upstream end to a downstream end thereof; and
   a support structure positioning the plurality of ducts in the array configuration, the support structure including:
   an annular central member, the plurality of ducts being arranged in an array around the annular central member;
   at least one ring surrounding the plurality of ducts; and
   a radial array of radially-extending members extending between the annular central member and the at least one ring, wherein radially inner ends of the radially-extending members are directly coupled to the annular central member using pins received in holes.

2. The apparatus of claim 1 wherein the array configuration is a complete ring.

3. The apparatus of claim 1 wherein the ducts comprise a ceramic-based composite material.

4. The apparatus of claim 1 wherein the peripheral wall structure comprises a pair of spaced-apart lateral walls joined to each other by an inboard wall and an outboard wall.

5. The apparatus of claim 1 wherein a ratio of a flow area at the downstream end of the duct to a flow area at the upstream end of the duct is other than unity.

6. The apparatus of claim 1 wherein the peripheral wall structure is a monolithic whole.

7. The apparatus of claim 1 wherein the radially-extending members are struts disposed between adjacent ducts.

8. The apparatus of claim 7 further comprising at least one closeout having an open-ended recess which accepts portions of lateral walls of adjacent ducts therein.

9. The apparatus of claim 1 wherein the support structure includes at least one closeout having an open-ended recess which accepts portions of lateral walls of adjacent ducts therein.

10. A flowpath apparatus for a gas turbine engine, comprising:
    an annular central member;
    a plurality of ducts arranged in a ring around the annular central member, each duct comprising a peripheral wall structure having a closed perimeter that defines a flow channel extending from an upstream end to a downstream end thereof;
    at least one ring surrounding the plurality of ducts;
    a radial array of radially-extending members extending between the central member and the at least one ring;
    an additional annular member disposed partially axially forward or partially axially aft of the central member; and
    a plurality of resilient tabs extending axially from the central member, wherein the distal ends of the resilient tabs are coupled to the additional annular member.

11. The apparatus of claim 10 wherein the array of radially-extending members includes at least one closeout having an open-ended recess which accepts portions of lateral walls of adjacent ducts therein.

12. The apparatus of claim 10 wherein radially inner ends of the radially-extending members are coupled to the central member using pins received in holes.

13. The apparatus of claim 10 wherein the central member is a sump housing.

14. The apparatus of claim 10 wherein the radially-extending members are struts disposed between adjacent ducts.

15. The apparatus of claim 14 further comprising at least one closeout having an open-ended recess which accepts portions of lateral walls of adjacent ducts therein.

16. The apparatus of claim 10 wherein the ducts comprise a ceramic-based composite material.

* * * * *